(12) United States Patent
Shimizu et al.

(10) Patent No.: US 6,624,528 B2
(45) Date of Patent: Sep. 23, 2003

(54) ENGINE OPERATED GENERATOR

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 09/880,076

(22) Filed: Jun. 14, 2001

(65) Prior Publication Data

US 2002/0047271 A1 Apr. 25, 2002

(30) Foreign Application Priority Data

Jun. 30, 2000 (JP) .......................... 2000-198050

(51) Int. Cl.$^7$ ................................. H02P 9/04
(52) U.S. Cl. ................. 290/40 C; 290/40 B; 290/40 R
(58) Field of Search .............................. 290/40 B, 40 C, 290/40 R

(56) References Cited

U.S. PATENT DOCUMENTS

| | | | | |
|---|---|---|---|---|
| 5,685,802 A | * | 11/1997 | Kanno | 477/111 |
| 5,703,410 A | * | 12/1997 | Maekawa | 290/40 C |
| 6,130,486 A | * | 10/2000 | Shimizu et al. | 290/40 C |
| 6,335,574 B1 | * | 1/2002 | Ochiai et al. | 290/40 C |
| 6,417,577 B1 | * | 7/2002 | Grewe et al. | 290/40 C |
| 6,424,053 B1 | * | 7/2002 | Wakashiro et al. | 290/40 C |

FOREIGN PATENT DOCUMENTS

| | | |
|---|---|---|
| JP | 5-018285 | 1/1993 |
| JP | 5-146200 | 6/1993 |
| JP | 11-308896 | 11/1999 |

* cited by examiner

*Primary Examiner*—Nestor Ramirez
*Assistant Examiner*—Leda T. Pham
(74) *Attorney, Agent, or Firm*—Armstrong, Westerman & Hattori, LLP

(57) ABSTRACT

It is featured that a generator can respond to a variation in the load with a generous margin regardless of the its temperature. The output current of the generator 1 is rectified with a converter 3 consisting mainly of a thyristor bridge. A direct current output of the converter 3 is then converted by an inverter 4 into an alternating current at a commercial frequency and then connected to the load 5. The engine speed is controlled so that the on state angle of the thyristors in the converter 3 is maintained to a target angle. Since the target angle is set within a range not higher than the maximum limit, the generator can constantly run with a generous margin and readily respond to a variation in the load. The target angle can be modified depending on the temperature of the generator 1 in order to inhibit the engine from being overloaded and its speed from increasing excessively.

10 Claims, 3 Drawing Sheets

20% | 75% (α)

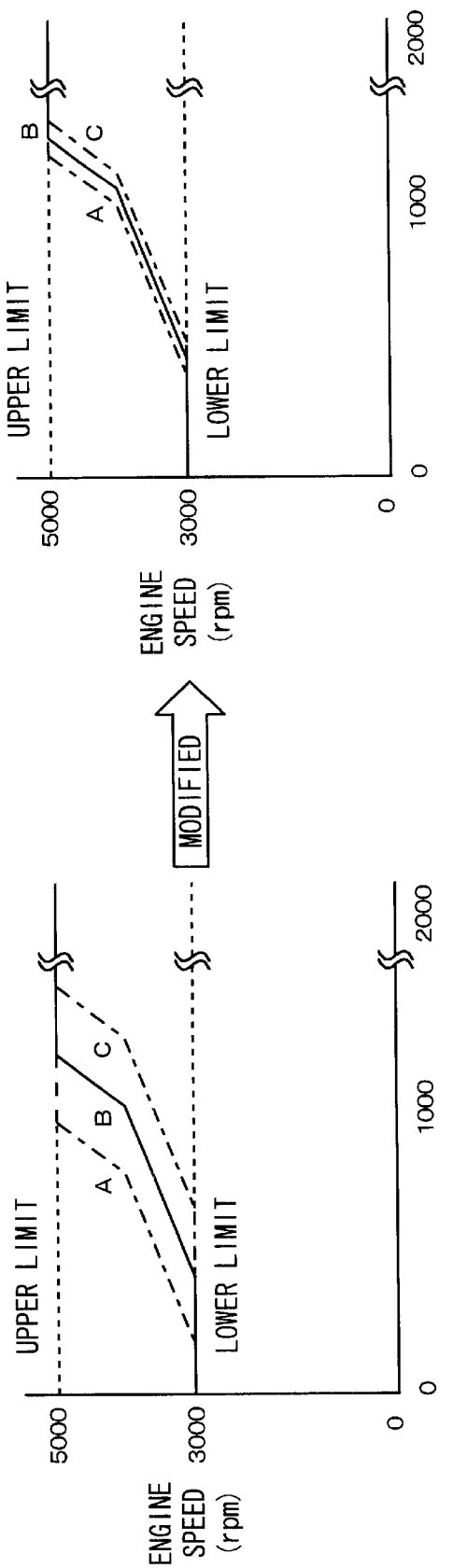

ENGINE OPERATED GENERATOR

BACKGROUND OF THE INVENTION

1. Field of the Invention

The present invention relates to an engine operated generator and particularly, to an engine operated generator where the number of revolutions of an engine can be controlled in response to a load and a variation in temperature.

2. Description of the Related Art

A lot of engine operated generator used generally as alternating current power sources are equipped with an inverter for stabilizing the output frequency. In such a conventional engine operated generator, an alternating current is generated by a generator driven by an engine, temporally converted into a direct current, and converted back by an inverter to an alternating current output at the commercial frequency before being released. The conventional generator system equipped with the inverter allows its output frequency to be hardly dependent on the number of revolutions of the engine and can determine its output through controlling the number of revolutions of the engine in response to a load.

For example, an inverter equipped engine operated generator is disclosed in Japanese Patent Laid-open Publication (Heisei) 5-18285 where the load is estimated in accordance with an output current from the inverter and used for controlling a throttle opening of the engine. This permits the output voltage of the generator to maintain at substantially a uniform level regardless of variations of the load.

Also, disclosed in Japanese Patent Laid-open Publication (Heisei) 5-146200 is an engine operated generator which can detect its output voltage at the input of an inverter and compare with a predetermined reference voltage to determine the number of revolutions of the engine corresponding to the load.

Applicant of this patent application have proposed an engine operated generator which is equipped with a converter consisted of a semiconductor rectifier element for rectifying the output current of a generator and arranged to control the number of revolutions of the engine so that the conduction angle of the semiconductor rectifier element is converged at a target degree which is smaller than the maximum limit of conduction angle thus to maintain the output voltage of the converter to a desired level (Japanese Patent Laid-open Publication (Heisei) 11-308896). As the generator runs with a moderate margin, it can readily respond to an increase in the load within the margin. Also, the output of the generator can be prevented from being affected by a variation in the number of revolutions of the engine.

It is further desired to improve the conventional generator where the conduction angle of the semiconductor rectifier element is controlled to a target degree which stays smaller than its maximum limit. Generally, the generator is easily affected by the temperature fluctuation. Particularly in a magnet type of the generator having a rotor made of permanent magnets, the magnets develop a magnetic field of higher intensity and the resistance in windings is declined when the temperature is low. As a result, the loss will be minimized. However, when the temperature is high, the magnets develop a magnetic field of lower intensity and the resistance in the windings is increased. Accordingly, the loss will be increased and the output of the system will be lower than at the lower temperature. For an instance, the output may be declined by 10% when the temperature drops down. In that case, while the conduction rate of the semiconductor rectifier element (such as the target degree of the conduction angle of thyristors) remains unchanged, the number of revolutions of the engine at the high temperature can be 10% greater than that at the low temperature.

When the generator having the above characteristics is operated with parameters predetermined for the high temperature, its output remains sufficient at the low temperature regardless of the load. Accordingly, as the conduction angle of the thyristors is not greater than the reference level, the number of revolutions of the engine can hardly be increased. As the number of revolution of the engine is hardly increased to a target level predetermined, the output of the engine will be declined and its action may be overloaded.

It is now assumed that the number of revolutions of the engine is controlled between 3000 and 5000 rpm and the loaded output and the number of revolution of the engine are 1000 VA and 4000 rpm respectively at the normal temperature. When the temperature drops down to −15° C., the generator increases the efficiency and its output is higher than at the normal temperature. With the loaded output remaining at 1000 VA, the number of revolutions of the engine will be 3000 to 3200 rpm. Using the number of revolutions smaller than 4000 rpm, the engine may hardly produce electricity of 1000 VA (or be overloaded).

On the contrary, when the temperature is higher than the normal temperature, the generator declines the efficiency and its output is lower than that at the normal temperature. Accordingly, the number of revolutions of the engine will increase excessively. The effect of a variation in the temperature may involve when the generator remains cool, e.g. at the startup, or when the generator remains heated up, e.g. during the continuous running. The characteristic of the number of revolutions may unfavorably be affected by the temperature fluctuation.

SUMMARY OF THE INVENTION

It is an object of the present invention to provide an engine operated generator which has a generator arranged to constantly provide its actual performance with a comfortable margin and stably control its output voltage in response to a wider range of electrical load and an engine which drives the generator that is arranged to control the number of revolutions regardless of a variation in the temperature.

The present invention which has the first feature comprises, a converter composed of a semiconductor rectifying element for rectifying the output current of a generator driven by an engine, an inverter for converting a direct current received from the converter into an alternating current at a desired frequency, a semiconductor rectifying element driving circuit for controlling the conduction of the semiconductor rectifying element to adjust the output voltage of the converter to a target level, a conduction rate detecting means for detecting the rate of conduction of the semiconductor rectifying element, an engine revolution controlling means for controlling the number of revolutions of the engine so that the rate of conduction detected by the conduction rate detecting means is converged at a target rate, and a modifying means for modifying the target rate in response to the temperature of the generator.

The present invention which has the second feature that the modifying means is arranged for increasing the target rate when the temperature of the generator is lower than a reference temperature and decreasing the target rate when the temperature of the generator is higher than the reference temperature.

The present invention which has the third feature that the temperature of the generator is represented by the temperature of a power controlling element provided in the inverter.

The present invention which has the fourth feature that the temperature of the generator is represented by the temperature of a power controlling element provided in the converter.

The present invention which has the fifth feature that the rate of conduction is an conduction angle of the semiconductor rectifying element and its target degree is hence a target degree of conduction.

The present invention which has the sixth feature that the generator is a magnet generator.

According to the features of the present invention, the number of revolutions of the engine can be controlled so that the angle or rate of conduction of the semiconductor rectifying element is converged at a target degree predetermined. In particular, when the temperature of the generator is varied, the number of revolutions of the engine can be controlled using a modification of the target degree in response to the output of the generator.

According to the second feature, when the output of the generator increases with the temperature remaining low, the rate of conduction exceeds the target rate early and the number of revolutions of the engine is thus increased quickly. As a result, the engine will hardly be declined in the power output and its overload running will successfully be avoided. When the output of the generator increases with the temperature remaining high, the rate exceeds the target rate slowly and the increase of the number of revolutions of the engine is delayed. As a result, the engine will be inhibited from running at an excessively higher number of revolutions.

According to the third feature, the rate of conduction can be modified depending on the temperature of the power controlling element provided in the inverter or converter which positively represents the temperature of the generator. Also, according to the fourth feature, the conduction angle of the semiconductor rectifying element can be modified depending on the temperature of the generator. According to the fifth feature, the effect of a variation in the magnetic field developed by the permanent magnets which is caused by a variation in the temperature will be minimized.

BRIEF DESCRIPTION OF THE DRAWINGS

FIG. 6 is a diagram showing the relationship between the number of revolutions of an engine and the output voltage of a generator before and after the modification of the conduction angle in response to the temperature.

DETAILED DESCRIPTION OF THE PREFERRED EMBODIMENTS

Figure 1:
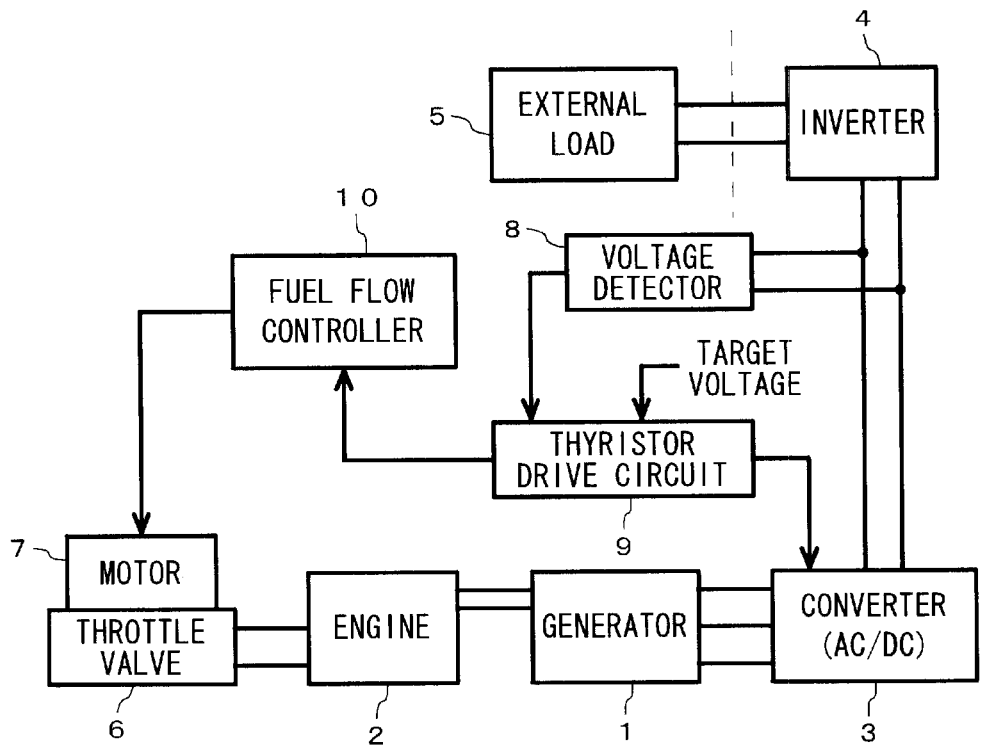
FIG. 1 is a block diagram of an arrangement of an engine operated generator showing one embodiment of the present invention.

One embodiment of the present invention will be described in more detail referring to the relevant drawings. FIG. 1 is a block diagram showing an arrangement of an engine operated generator. A magnetic multi-pole generator 1 (referred to as a generator hereinafter) having a permanent magnetic for developing a field magnetic flux is joined to an (internal combustion) engine 2. As the generator 1 is driven by the engine 2, it generates a multi-phase (commonly three-phase) alternating current. The alternating current is changed to its direct current form by the full-wave rectification of a converter 3 which incorporates a rectifying circuit having thyristors connected as the semiconductor rectifier elements in a bridge configuration and transmitted to an inverter 4. The inverter 4 is connected at its output with an external load 5 for supply of a single-phase alternating current output at the commercial frequency (50 Hz for example). A stepping motor 7 is also provided for controlling the throttle opening in the engine 2. More specifically, the opening of a throttle valve 6 is controlled with the number of pulses received by the stepping motor 7, thus determining the number of revolutions of the engine 2. The engine 2 can be equipped with a fuel injection. In that case, the controlling of the throttle opening is replaced by an action of controlling the fuel injection time for determining the number of revolutions.

The output voltage of the converter 3 is measured by a voltage detector 8. A thyristor drive circuit 9 compares the output voltage of the converter 3 with a reference voltage (170 V for example) which has been set as a target level and then controls the conduction or firing of the thyristors in a known manner so that the real output voltage of the converter 3 is equal to a desired voltage setting level. This arrangement allows the output voltage of the converter 3 to remain at the voltage setting level when it is in a particular current range where the conduction angle of the thyristors can be controlled. The converter 3 may be modified where its output voltage is determined by controlling the duty ratio of a power transistor. Be noted that the conduction angle and the duty ratio are referred to as the fired state rate of a semiconductor rectifier element in this description.

The semiconductor rectifier element is controlled to maintain its "on state" according to the conduction angle or conduction rate.

Figure 2:
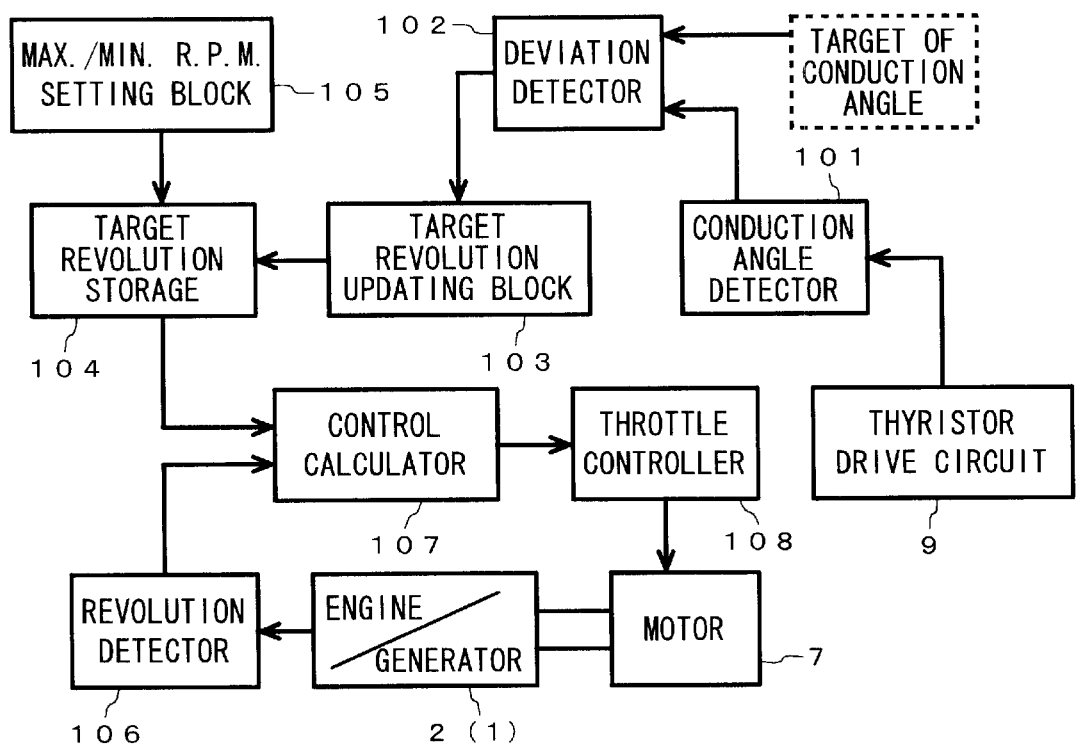
FIG. 2 is a block diagram showing a primary part of a fuel controller in the engine generator system.

A fuel flow controller 10 is now explained. FIG. 2 is a block diagram of an arrangement of the fuel flow controller 10. A thyristor conduction angle detector 101 measures the conduction angle of the thyristors according to the control signal supplied from the thyristor drive circuit 9 to the converter 3. The conduction angle is continuously measured at intervals of a given period and its average is calculated.

The average conduction angle calculated by the thyristor conduction angle detector 101 is transferred to a deviation detector 102 where a deviation from the target degree of conduction is detected. More particularly, it is judged from the average conduction angle of the thyristors whether or not the generator 1 is operated by a comfortable margin of the output. Preferably, for the purpose, the target degree of conduction may, for example, be 75%. More preferably, the target degree of conduction like a common setting for control may have a level of hysteresis.

As the number of revolutions of the engine 2 is controlled to a target value so that the deviation calculated by the deviation detector 102 is diminished to zero, the generator 1 runs in a favorable condition. The target degree of conduction is variable depending on the temperature of the generator 1 as will be explained later in more detail.

Figure 3:
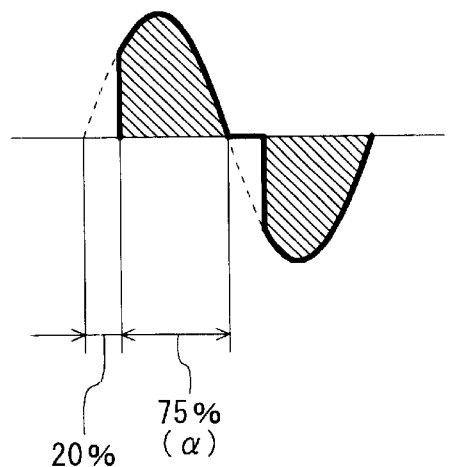
FIG. 3 is an explanatory diagram showing the conduction angle of thyristors.

FIG. 3 illustrates a waveform of the output voltage of the thyristors when the conduction angle is equal to 75%. As shown, the conduction angle α is an electrical angle corresponding to a period where the thyristors are kept "on state" and may be determined by a known means.

Figure 4:
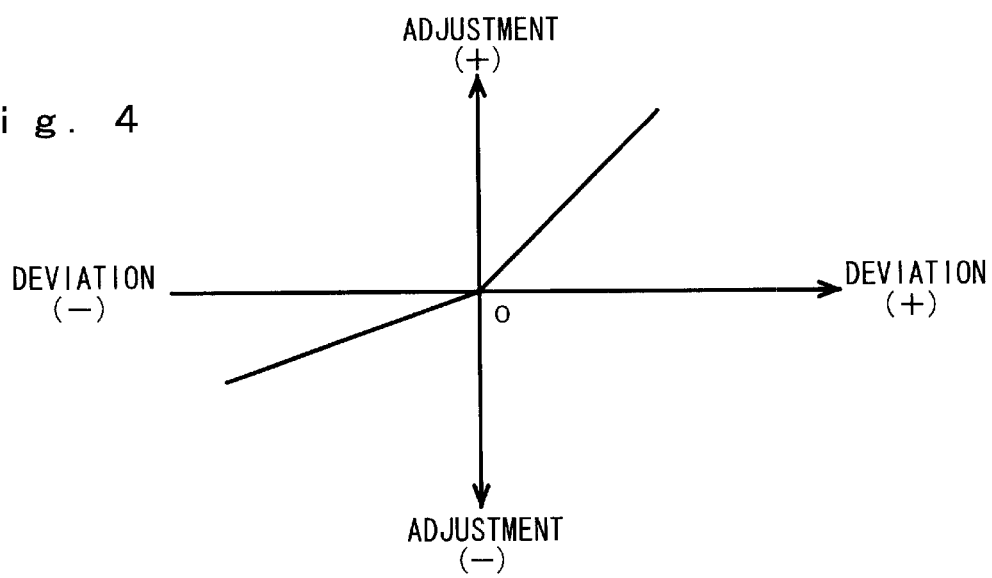
FIG. 4 is a diagram showing the relationship between a deviation of the conduction angle from a target and an adjustment of the target number of revolutions.

A target revolution updating block 103 is arranged responsive to the deviation from the deviation detector 102 for determining an adjustment in the number of revolutions. The target revolution updating block 103 may be implemented by a table where the adjustment in the number of revolutions is determined from the deviation as a corresponding readout address data. FIG. 4 is a diagram showing the relationship between the deviation and the adjustment in the number of revolutions. The deviation is a difference between the target degree of conduction and the actual degree of conduction (actual angle minus target angle).

As shown in FIG. 4, when the deviation is positive from the target degree of conduction, the adjustment in the number of revolutions is greater than when the deviation is negative. As the deviation is positive, it is judged that the conduction angle exceeds the target degree (75%) and the generator 1 has no margin. It is thus necessary for the generator 1 to increase the output in response to the load. On the contrary, when the deviation is negative, it is judged that the generator 1 has a wide margin. Because any excessive response causes an overshoot which abruptly varies the number of revolutions and has to be avoided, the adjustment in the number of revolutions will be set to a minimum.

Returning back to FIG. 2, a target revolution storage 104 is provided for receiving the adjustment in the target number of revolutions from the target revolution updating block 103 and adding it to the preceding target number of revolution stored to have a new target number of revolutions. The target number of revolutions may be updated within a range between the maximum and the minimum determined by a maximum/minimum revolution setting block 105. Even if the addition of the adjustment in the target number of revolution causes the target number of revolutions to depart from the range, the target number of revolutions stays at its maximum or minimum limit. The minimum limit is given for inhibiting the conduction angle of the thyristors from changing in response to a small variation in the number of revolutions thus to decline the stability at no or a minimum load.

A revolution detector 106 is provided for measuring the number of revolutions of the generator 1. A control calculator 107 calculates a control according to the actual number of revolutions received from the revolution detector 106 and the target number of revolutions received from the target revolution storage 104, using a known manner (e.g. a proportional, integral, or differential operation), so that the deviation of the number of revolutions from the target number is diminished to zero. A throttle controller 108 is connected to and supplies the stepping motor 7 with a pulse signal for driving the revolution according to an output of the control calculator 107. Upon receiving the pulse signal, the stepping motor 7 is driven to varies the throttle opening.

According to the embodiment, the number of revolutions of the engine 2 is controlled so that the average conduction angle of the thyristor bridge rectifying circuit for determining the output of the converter 3 can be maintained to a setting degree (for example, 75%). This allows the generator 1 to run constantly with a comfortable margin and feed a load with a level of power. More specifically, if the load increases, the conduction angle of the thyristors is increased in response to a variation in the output of the converter 3 resulting from an increase in the load. Also, as the conduction angle increases, the number of revolutions of the engine 2 can be increased moderately. As a result, the number of revolutions of the engine 2 will be inhibited from changing at a higher frequency and the generation of noise and the consumption of fuel of the engine 2 will be decreased.

This embodiment allows the output voltage of the generator to be measured with the input of the inverter, hence eliminating the need of calculating as parameters the effective output of power of the inverter, the efficiency of conversion of the converter, the generation of power per revolution, and differences between components in the generator and the effective power detector and simplifying the action of controlling. While the converter in this embodiment has thyristors connected in a bridge configuration for rectifying the current output of the generator, it may be of any voltage-controlled type, such as a switching DC voltage conversion type.

A procedure of modifying the target degree of conduction depending on the temperature of the generator 1 will now be described. As described previously, the action of controlling the system with the target degree of conduction remaining fixed when the temperature of the generator 1 is varied may cause the engine 2 to be overloaded or excessively increased in the number of revolutions. For compensation, the embodiment has the target degree of conduction of the thyristors in the converter 3 modified corresponding to the temperature of the generator 1.

It is necessary for directly measuring the temperature of the generator 1 to eliminate the following drawbacks. A common structure of the generator may largely be modified if the temperature of a magnet has to be measured during the running or a temperature sensor such as a thermistor is embedded in the windings. Such a modification in the structure may hardly be implemented without carefully studying its effect on the other factors. Also, when the temperature sensor is successfully attached to the windings, its lead to the controller may unfavorably be elongated.

In this embodiment, a thermistor is embedded as the temperature sensor in a power controlling device (e.g. an FET) used in the inverter 4 and its measurement is released as the temperature of the generator 1. The temperature of the power controlling device may not be identical to the temperature of the generator 1. However, since the two are closely correlated with each other, the former can represent the latter.

Figure 5:
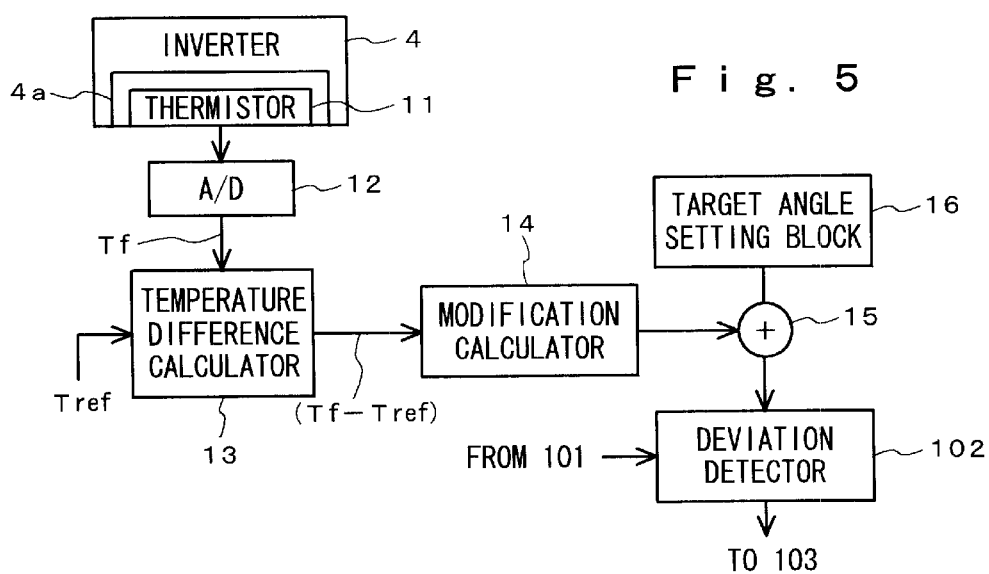
FIG. 5 is a block diagram showing a primary part of for modifying the conduction angle in response to the temperature.

FIG. 5 is a functional block diagram showing a primary part of the target conduction angle modifying controller. As shown, a thermistor 11 is embedded in an FET bridge 4a of the inverter 4. The output signal of the thermistor 11 is converted by an A/D converter 12 to a digital data and transferred to a temperature difference calculator 13. The temperature difference calculator 13 subtracts a comparative data Tref indicative of the normal temperature from the digital or input data Tf received from the A/D converter 12 and a resultant difference data is transmitted to a modification calculator 14. It is now assumed that the input data Tf ranges from 0 to 100 and the comparative data Tref is 50. The modification calculator 14 calculates modification M (%)=0.5×(Tf−50) and its result is supplied to an adder 15. The adder 15 adds the modification M to the target degree of conduction (e.g. 75%) at the normal temperature received from a target conduction angle setting block 16 and its resultant sum is transferred to the deviation detector 102.

Accordingly, when the temperature of the thyristors is low (equivalent to 10), the modification M (%) is −20 calculated from 0.5×(10−50). The target degree of conduction of 75% is then decreased by 20% to 55%. When the temperature of the thyristors is high (equivalent to 80), the modification M (%) is 15 calculated from 0.5×(80−50). The target degree of conduction of 75% is then increased by 15% to 90%.

FIG. 6 illustrates the relationship between the number of revolutions of the engine 2 and the output voltage of the generator 1 before and after the modification of the conduction angle based on the temperature. In the diagram, the vertical axis represents engine speed or the number of revolutions of the engine 2 and the horizontal axis represents the effective output of the generator 1. The number of revolutions of the engine is variable within a range from 3000 to 5000 rpm. The curves A, B and C profile measurements at the high, normal, and low temperatures respectively. As apparent, prior to the modification, the number of revolutions of the engine is higher at the high temperature than at the normal temperature and lower at the low temperature than at the normal temperature. After the modification, the number of revolutions of the engine per unit output is modified to a lower level at the high temperature or a higher level at the low temperature so that its level becomes close to that at the normal temperature.

While the temperature of the generator 1 is represented by the temperature of the inverter 4 in the embodiment, a dedicated temperature sensor may be installed in any other appropriate component provided that it corresponds favorably to the temperature of the generator 1 and its lead is extended at a permissive distance. For example, the temperature of the power controlling element used in the converter 3 may represent the temperature of the generator 1. In general, the power controlling element used in the inverter is equipped with a thermal sensor for prevention of overheat. Such a thermal sensor may be adapted for common use as the sensor for temperature modification.

According to the embodiment, the conduction angle of the thyristors is controlled so that the actual voltage output of the converter 3 is equal to a setting level. As the present invention is not limited to the controlling over the conduction angle. When a power transistor is used for controlling the voltage output of the converter 3, the duty ratio instead of the conduction angle may be modified depending on the temperature of the generator.

As apparent from the foregoing description, the features of the present invention defined in claims 1 to 6 permit the number of revolutions of the engine to be controlled so that the angle or rate of conduction of the semiconductor rectifying element is converged at a target degree predetermined. In particular, when the temperature of the generator is changed, the number of revolutions of the engine can be controlled using a modification of the target degree in response to the output of the generator.

According to the feature of the present invention defined in claim 2, when the output of the generator increases with the temperature remaining low, the rate of conduction exceeds the target degree early and the number of revolutions of the engine is thus increased quickly. As a result, the engine will hardly be declined in the power output and its overload running will successfully be avoided. When the output of the generator increases with the temperature remaining high, the rate of conduction exceeds the target degree slowly and the increase of the number of revolutions of the engine is delayed. As a result, the engine will be inhibited from running at an excessively higher number of revolutions.

According to the features of the present invention defined in claims 3 and 4, the rate of conduction can be modified depending on the temperature of the power controlling element provided in the inverter or converter which positively represents the temperature of the generator. More specifically, as the power controlling element is connected across which a load current is passed, its temperature measurement exhibits a gradient of the temperature on the generator resulted from the increase and decrease of the output of the generator. Also, this permits the temperature to be measured with use of no complex pattern of wirings. Moreover, according to the feature of the present invention defined in claim 6, the effect of a variation in the magnetic field developed by the permanent magnets which is caused by a variation in the temperature will be minimized.

What is claimed is:

1. An engine operated generator having a converter composed of a semiconductor rectifying element for rectifying the output current of an operated generator driven by an engine and an inverter for converting a direct current received from the converter into an alternating current at a desired frequency, comprising:

a semiconductor rectifying element driving circuit for controlling the conduction of the semiconductor rectifying element to adjust the output voltage of the converter to a target level;

a conduction rate detecting means for detecting the rate of conduction of the semiconductor rectifying element;

an engine revolution controlling means for controlling the number of revolutions of the engine so that the rate of conduction detected by the conduction rate detecting means is converged at a target rate; and a modifying means for modifying the target rate in response to a temperature of the operated generator.

2. An engine operated generator according to claim 1, wherein the modifying means is arranged for increasing the target rate when the temperature of the operated generator is lower than a normal temperature and decreasing the target rate when the temperature of the operated generator is higher than the normal temperature.

3. An engine operated generator according to claim 1 or 2, wherein the temperature of the generator is represented by the temperature of a power controlling element provided in the inverter.

4. An engine operated generator according to claim 1 or 2, wherein the temperature of the generator is represented by the temperature of a power controlling element provided in the converter.

5. An engine operated generator according to claim 1, wherein the rate of conduction is an conduction angle of the semiconductor rectifying element and its target degree is hence a target degree of conduction.

6. An engine operated generator according to claim 2, wherein the rate of conduction is an conduction angle of the semiconductor rectifying element and its target degree is hence a target degree of conduction.

7. An engine operated generator according to claim 3, wherein the rate of conduction is an conduction angle of the semiconductor rectifying element and its target degree is hence a target degree of conduction.

8. An engine operated generator according to claim 4, wherein the rate of conduction is an conduction angle of the semiconductor rectifying element and its target degree is hence a target degree of conduction.

9. An engine operated generator according to claim 1, wherein the generator is a magnet generator.

10. An engine operated generator according to claim 2, wherein the generator is a magnet generator.

* * * * *